July 25, 1933.   R. E. LYFORD   1,919,340
MECHANICALLY EXPANSIBLE ELEMENT
Filed July 13, 1929    2 Sheets-Sheet 1
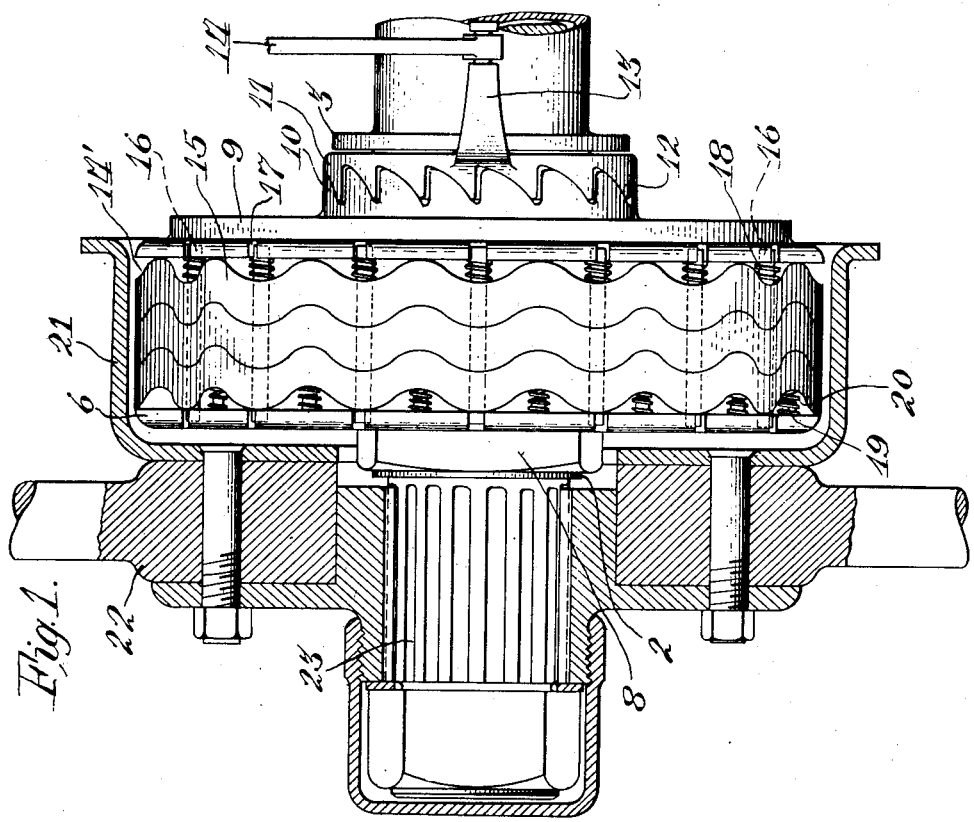
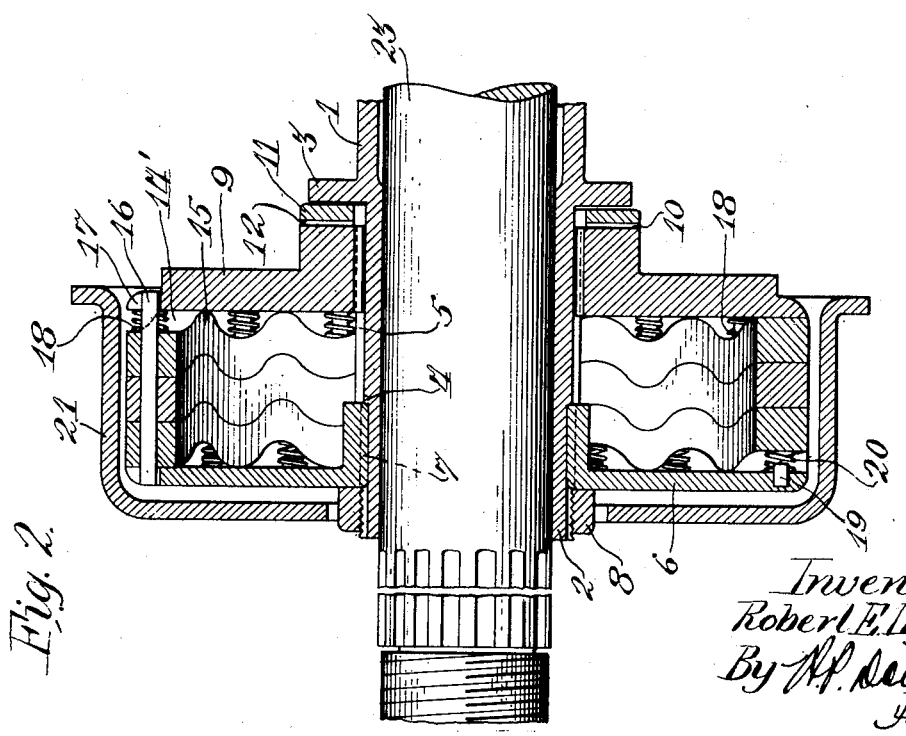
Inventor
Robert E. Lyford
By his Attorney July 25, 1933.  R. E. LYFORD  1,919,340
MECHANICALLY EXPANSIBLE ELEMENT
Filed July 13, 1929   2 Sheets-Sheet 2

Inventor
Robert E. Lyford
By H. P. Doolittle
Atty

Patented July 25, 1933

1,919,340

UNITED STATES PATENT OFFICE

ROBERT E. LYFORD, OF CHICAGO, ILLINOIS, ASSIGNOR TO INTERNATIONAL HARVESTER COMPANY, A CORPORATION OF NEW JERSEY

MECHANICALLY EXPANSIBLE ELEMENT

Application filed July 13, 1929. Serial No. 378,169.

This invention relates to elements capable of being altered in one dimension by the variation of pressure on the element applied in the direction of another dimension, and to devices embodying such elements.

More particularly, the invention relates to elements adaptable for use in devices having two contact surfaces or two similar surfaces which may be brought into contact. The invention is particularly applicable to devices having two elements with surfaces of revolution, such as cones or cylinders, which are mounted for rotation, reciprocation, or contraction or expansion with respect to each other. The elements may be mounted so that the surfaces contact and may be lubricated as in friction reducing bearings, or may be frictionally engageable as in brakes and clutches. The elements may also be mounted to provide a variable, annular space between two stationary elements.

The object of the invention is to devise and construct elements which will function for the purposes above set forth and for similar purposes. The principal object is to construct an element capable of dimensional alteration when subject to pressure. Another object is to construct elements for surface contact devices capable of being adjusted to desired engaging pressure or to provide the desired clearance.

I attain the above objects by the novel construction hereinafter described in detail of comparatively narrow bands or rings, or elements with portions having surfaces similar thereto. The bands or similar elements are corrugated or undulated. The general location of the corrugations or undulations can best be defined by considering the band or band-like elements as being bounded by two spaced planes. The corrugations are in a direction at right angles to the planes and the element is alternately tangent to the planes. When pressure is applied on the corrugations, the elements are capable of expansion. When the pressure is released, the natural resiliency of the element acts to contract it to the normal position. It is also obvious that circumferential pressure would contract such an element, if applied on the outside, and expand the element, if the pressure were to be applied on the inside.

Suitable members may contact with or be rigidly attached to the loops of the undulating bands or similar elements, and means are provided for applying pressure to these members. In some modifications of the invention, the undulating bands, or like members having the same characteristics, may be compressed or expanded before being positioned in engagement with the cooperating members. In this case, the resiliency of the undulating member may serve to maintain the proper radial relationship without any additional pressure means.

Although this invention is applicable to any closed band-like elements, it is particularly adaptable to such elements having surfaces of revolution geometrically defined, such as elements having conical or cylindrical surfaces. In the drawings and description, only cylindrical forms have been shown and described.

The drawings show the invention embodied in a brake. In these drawings,—

Figure 1 is a side elevation, partly in section;

Figure 2 is a section taken on the line 2—2 of Figure 3;

Figure 3:
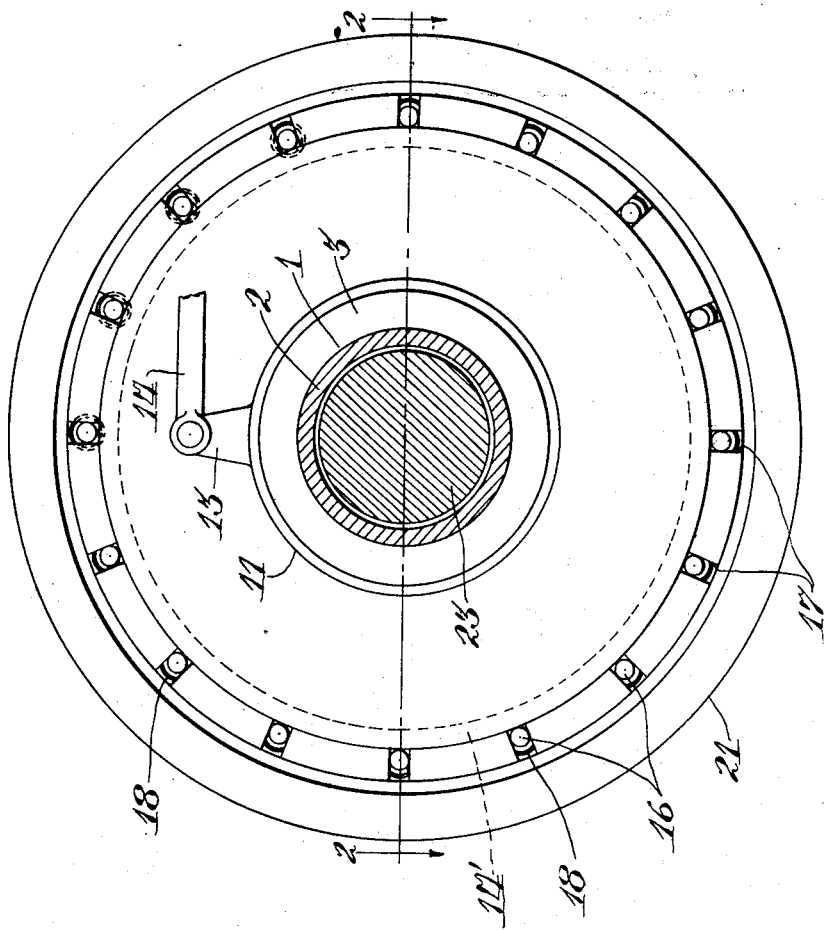
Figure 3 is an end view.
Figure 4:
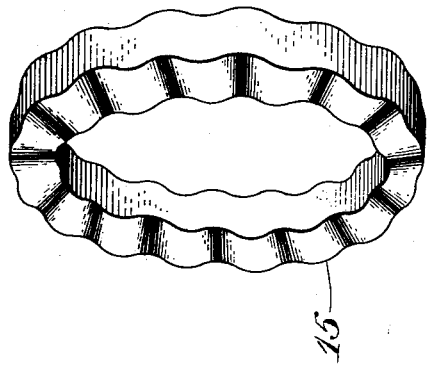
Figure 4 is a perspective of an expansible element similar to those employed in the brake shown in Figures 1, 2, and 3.

As shown in the drawings, an axle housing 1 is threaded at the outer end 2 and is provided with a flange 3 spaced from the end. The housing is also provided with a shoulder 4 and spline grooves 5. A plate 6 is rigidly secured to the housing by engagement with splines 7. The plate 6 is held in position against the shoulder 4 by a nut 8 on the threaded end of the housing.

A plate 9 is splined on the housing for longitudinal movement with respect thereto between the plate 6 and the flange 3.

The plate 9 is provided with a series of cam surfaces 10 adjacent the axle housing 1. An annular actuating collar 11 is positioned between the flange 3 and the plate 9 and is provided with a series of cam surfaces 12 mating with the cam surfaces 10 on the plate. The actuating collar is provided with an extension 13 to which an operating rod 14 is attached.

The contact assembly 14' is made up of one or more annular band-like elements 15, which are corrugated or undulated circumferentially in the direction of the axis of the housing. The elements 15 are of such a material as to be inherently resilient. The use to which the device is to be put, the clearance between the contact assembly and the surrounding drum, the pressure available to act on the elements, and the size of the corrugations relative to the thickness of the individual elements are some of the factors determining the choice of material. Thin steel bands of a considerable number might be used. Rubber or rubber fabric or composition of a much greater thickness in proportion to the size of the corrugation may be used. Asbestos fabric or molded elements would be used for brakes or clutches, as this material withstands the heat. Any material having the required resiliency and other necessary properties may be utilized. Pins 16 extend through the elements 15 and into aligned slots 17 in the plates 6 and 9. Springs 18 may be positioned on the ends of the pins 16 which emerge from the low parts or depressions of the undulations in elements 15. As shown in the particular device illustrated in the drawings, the pins 16 extend through the undulated members 15 at the points where the depressions on said members are adjacent the plate 9. It may be found desirable to provide projecting members 19 on the plate 6 to provide seats for springs 20 positioned to engage the depressions on the elements 15, which are adjacent the plate 6.

A drum 21 mounted for rotation with respect to the housing surrounds the contact assembly 14' in close proximity thereto. As shown in Figure 1, the drum may be attached to a wheel 22 mounted on an axle 23 rotatable in the housing 1.

In the operation of the device, the plate 9 is moved towards the plate 6 by operating the actuating collar 11, thereby exerting an axial pressure on the contact assembly 14.' In the case of a brake or clutch, the assembly 14' may be made up of a molded composition such as is commonly used for that purpose, or it may be composed of metallic bands shaped as shown.

Compression on opposite sides of the contact assembly 14' tends to flatten the undulations and thereby increase the circumference of the member and causes it to frictionally engage the drum 21, which is mounted with the proper clearance. Upon releasing the axial pressure, the inherent resiliency of the elements 15 causes them to regain their original form, thereby reducing their circumference and disengaging the drum 21.

When the contact assembly 14' is composed of material such as woven brake lining, the resiliency of which may not be great enough to sufficiently reduce the circumference upon release of the axial pressure, springs, such as shown at 18 and 20, may be provided for that purpose.

In Figure 3, the pins 16 are shown at the bottom of the slots 17. In this position the elements 15 are in the contracted position with respect to the drum 21. When the contact assembly 14' is expanded, the pins 16 move outwardly in the slots 17. It will be noted that the contact member is, therefore, self-centering with respect to the drum 21.

Although I have illustrated and described my invention as embodied in a friction contact device of the type ordinarily employed in brakes, it has a wide field of use. All of the uses to which it may be put are contemplated, and the invention is limited only by the scope of the appended claims.

What is claimed is:—

1. A surface contacting device comprising a member having a surface of revolution, a second member having a similar surface positioned to engage the first mentioned surface, the surface of the second member being comparatively narrow and undulated in the direction of the axis of the surface, and means to alter the circumference of the undulated surface.

2. A surface contacting device comprising a member having a surface of revolution, a second member having a similar surface positioned to engage the first mentioned surface, the surface of the second member being comparatively narrow and undulated in the direction of the axis of the surface, and means to exert variable pressures axially on the member having the undulated surface whereby the circumference of said surface is altered.

ROBERT E. LYFORD.